(12) United States Patent
Xiong et al.

(10) Patent No.: US 11,797,277 B2
(45) Date of Patent: Oct. 24, 2023

(54) NEURAL NETWORK MODEL CONVERSION METHOD SERVER, AND STORAGE MEDIUM

(71) Applicant: Shenzhen Corerain Technologies Co., Ltd., Shenzhen (CN)

(72) Inventors: Chao Xiong, Shenzhen (CN); Kuenhung Tsoi, Shenzhen (CN); Xinyu Niu, Shenzhen (CN)

(73) Assignee: Shenzhen Corerain Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/771,040

(22) PCT Filed: Oct. 22, 2019

(86) PCT No.: PCT/CN2019/112464
§ 371 (c)(1),
(2) Date: Apr. 22, 2022

(87) PCT Pub. No.: WO2021/077282
PCT Pub. Date: Apr. 29, 2021

(65) Prior Publication Data
US 2022/0365762 A1    Nov. 17, 2022

(51) Int. Cl.
*G06F 8/41* (2018.01)
*G06F 8/74* (2018.01)
(Continued)

(52) U.S. Cl.
CPC ............... *G06F 8/427* (2013.01); *G06F 8/74* (2013.01); *G06N 3/063* (2013.01); *G06N 3/10* (2013.01)

(58) Field of Classification Search
CPC .............. G06F 8/427; G06F 8/74; G06N 3/10
See application file for complete search history.

(56) References Cited

U.S. PATENT DOCUMENTS

2019/0220730 A1*  7/2019  Hardjasa ............... G06Q 50/163
2019/0286973 A1*  9/2019  Kovvuri ................. G06N 3/04
(Continued)

FOREIGN PATENT DOCUMENTS

| CN | 108021395 | 5/2018 |
| CN | 108292374 | 7/2018 |

(Continued)

OTHER PUBLICATIONS

Baskin, Chaim, et al., Streaming Architecture for Large-Scale Quantized Neural Networks on an FPGA-Based Dataflow Platform, IEEE International Parallel and Distributed Processing Symposium Workshops, 2018, 8 pages, [retrieved on Aug. 16, 2023], Retrieved from the Internet: <URL:http://ieeexplore.ieee.org/>.*
(Continued)

*Primary Examiner* — Geoffrey R St Leger (57) ABSTRACT

A neural network model conversion method, a server, and a storage medium are provided according to embodiments of the present disclosure. The neural network model conversion method includes: parsing a neural network model to obtain initial model information; reconstructing the initial model information to obtain streaming model information; generating a target model information file according to the streaming model information; and running, under a streaming architecture, the neural network model according to the target model information file.

5 Claims, 3 Drawing Sheets

(51) Int. Cl.
*G06N 3/10* (2006.01)
*G06N 3/063* (2023.01)

(56) References Cited

U.S. PATENT DOCUMENTS

2020/0242189 A1* 7/2020 Chatterjee ................. G06F 9/44
2021/0073625 A1* 3/2021 Cai ........................ G06N 3/063

FOREIGN PATENT DOCUMENTS

CN           110192210         8/2019
WO    WO-2019190726 A1 * 10/2019 ......... G06K 9/00791

OTHER PUBLICATIONS

Umuroglu, Yaman, et al., FINN: A Framework for Fast, Scalable Binarized Neural Network Inference, Proceedings of the 2017 ACM/SIGDA International Symposium on Field-Programmable Gate Arrays, 2017, 10 pages, [retrieved on Aug. 16, 2023], Retrieved from the Internet: <URL:http://dl.acm.org/>.*
International Search Report for PCT/CN2019/112464 dated Mar. 31, 2020.

* cited by examiner

NEURAL NETWORK MODEL CONVERSION METHOD SERVER, AND STORAGE MEDIUM

CROSS-REFERENCE TO RELATED APPLICATION(S)

This is a national stage application filed under 37 U.S.C. 371 based on International Patent Application No. PCT/CN2019/112464, filed Oct. 22, 2019, the disclosure of which is incorporated herein by reference in its entirety.

FIELD

Embodiments of the present disclosure relate to the field of neural network model application, for example, to a neural network model conversion method, a neural network model conversion apparatus, a server, and a storage medium.

BACKGROUND

With the continuous maturity of deep learning technology, the application fields of neural network models are also expanding. Due to the high computational complexity of deep learning algorithms, computation devices (chips) cannot meet the requirements of many scenarios. To address this problem, more and more special inference chips for deep learning has been introduced in industry.

However, most inference chips are still based on the conventional instruction set architecture in which the operator granularity is at a tensor operator level, resulting in a low computation efficiency, and insufficient computation power for supporting various application scenarios, and limited optimization for customization of deep learning-related computation.

The customized streaming architecture breaks the limitations of the conventional instruction set architecture, and has been deeply optimized for the deep learning computation framework. In the streaming architecture, a minimum computation resolution at a basic layer operator level of deep learning is defined instead of the general instruction set. A granularity of the basic operators is larger than those of the conventional instruction set architecture, which contributes to a higher computation efficiency. However, if an algorithm trained under the instruction set architecture is to be deployed under the streaming architecture, there will be a problem of mismatching between the operator granularities of the two architectures, so additional processing is required.

SUMMARY

A neural network model conversion method, a neural network model conversion apparatus, a server, and a storage medium are provided according to embodiments of the present disclosure, to deploy a neural network model developed under an instruction set architecture to be under a streaming architecture for computation, thereby improving development efficiency.

A neural network model conversion method is provided according to embodiments of the present disclosure, which includes:
  parsing a neural network model to obtain initial model information;
  reconstructing the initial model information to obtain streaming model information;
  generating a target model information file according to the streaming model information; and
  running, under a target streaming architecture, the neural network model according to the target model information file.

A neural network model conversion apparatus is provided according to embodiments of the present disclosure, which includes: a neural network model parsing module, an initial model information reconstructing module, a target model information file generating module, and a neural network model running module.

The neural network model parsing module is configured to parse a neural network model to obtain initial model information.

The initial model information reconstructing module is configured to reconstruct the initial model information to obtain streaming model information.

The target model information file generating module is configured to generate a target model information file according to the streaming model information.

The neural network model running module is configured to run, under a target streaming architecture, the neural network model according to the target model information file.

A server is provided according to embodiments of the present disclosure, which includes one or more processors, and a storage equipment configured to store one or more programs.

The one or more programs, when being executed by the one or more processors, cause the one or more processors to implement the neural network model conversion method according to any embodiment of the present disclosure.

It is provided according to embodiments of the present disclosure a computer-readable storage medium storing a computer program, and the computer program, when being executed by a processor, implements the neural network model conversion method according to any embodiment of the present disclosure.

DETAILED DESCRIPTION

The present disclosure is described hereinafter with reference to the drawings and embodiments. The embodiments described herein are only for explaining the present disclosure, rather than limiting the present disclosure. For convenience of description, only part of structures rather than all structures related to the present disclosure are shown in the drawings.

Some exemplary embodiments are described as processes or methods depicted by the flowcharts. Although the flowcharts depict multiple steps as a sequential process, the multiple steps herein may be performed in parallel, concurrently, or simultaneously. Furthermore, a sequence of the multiple steps may be rearranged. After the multiple steps are operated, the process may be terminated, but may also include additional steps which are not included in the drawings. The process herein may correspond to a method, a function, a procedure, a subroutine, a subprogram, or the like.

The terms "first," "second," and etc. may be used herein to describe various directions, various acts, various steps or various elements, and etc., but are not used to limit these directions, acts, steps or elements. The terms "first," "second," and etc. are only used to distinguish a first direction, a first act, a first step or a first element from another direction, another act, another step or another element respectively. For example, a first operator may be referred to as a second operator, and similarly, a second operator may be referred to as a first operator, without departing from the scope of this application. Both the first operator and the second operator are operators, but the first operator and the second operator are not the same operator. The terms "first", "second", etc. should not be understood as indicating or implying relative importance or implying the number of the indicated technical features. Thus, features with prefixes "first" or "second" may expressly or implicitly include one or more of those features. In the description of this application, "plurality/multiple" means at least two, such as two, three, etc., unless otherwise defined.

First Embodiment

Figure 1:
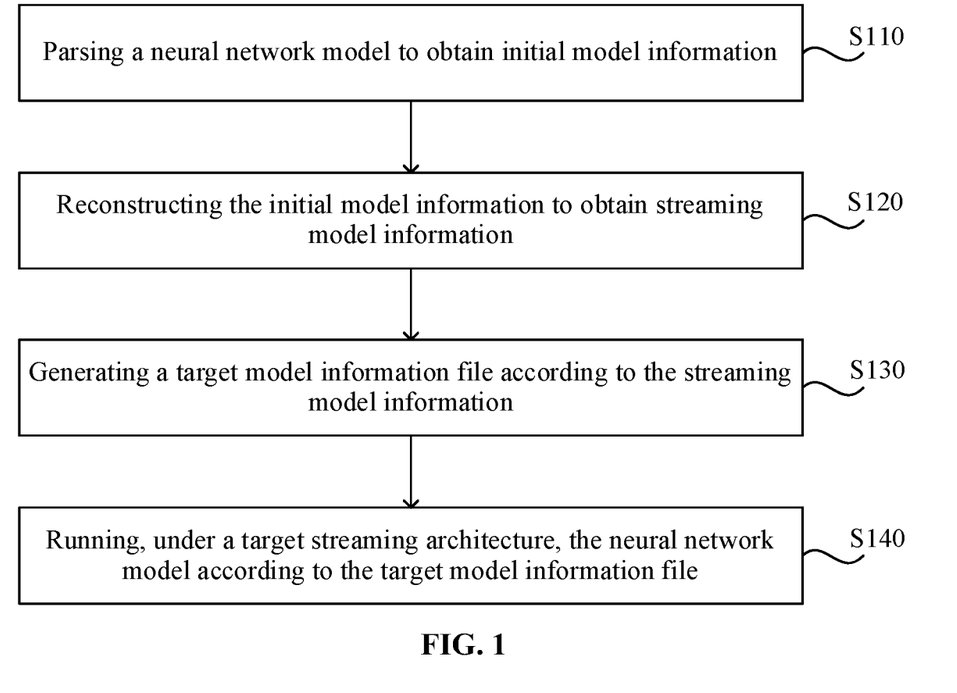
FIG. 1 is a schematic flowchart of a neural network model conversion method according to a first embodiment of the present disclosure.

FIG. 1 is a schematic flowchart of a neural network model conversion method according to a first embodiment of the present disclosure, the neural network model conversion method according to the present embodiments is applicable to deploying a neural network model developed under an instruction set architecture to be in a chip based on a streaming architecture for running. The neural network model conversion method may be implemented by a neural network model conversion apparatus, and the apparatus may be implemented in a form of software and/or hardware, and may be integrated in a server.

As shown in FIG. 1, the neural network model conversion method according to the first embodiment of the present disclosure includes the following operations: S110, S120, S130 and S140.

S110: parsing a neural network model to obtain initial model information.

In the present embodiments, the neural network model is a complex network system formed by a large number of simple processing units extensively interconnected, which reflects many basic features of human brain functions and is a highly complex nonlinear dynamic learning system. In the field of neural network model application, the simple processing units of the neural network model are referred to as operators. The neural network model was usually developed based on a learning framework running on an instruction set architecture, such as TensorFlow, Caffe, Mxnet, Torch, and etc.

Parsing a neural network model to obtain initial model information is to decompose a neural network model, and to extract a large number of first operators, connection relationships among the first operators and computation parameters of the corresponding first operators included in the neural network model. The initial model information includes an initial computation graph and initial model data, the initial computation graph includes information on the types of the first operators and the connection relationships among the first operators, and the initial model data includes the computation parameters of the corresponding first operators.

S120: reconstructing the initial model information to obtain streaming model information.

In the present embodiments, the initial model information is obtained by parsing the neural network model, and the neural network model was developed based on the instruction set architecture, so the initial computation graph and the initial model data included in the initial model information are still an instruction set based. Reconstructing the initial model information is to fuse and optimize the first operators under the instruction set architecture, and convert the first operators under the instruction set architecture into second operators under a streaming architecture, and thus, the initial model information can be converted to streaming model information. The streaming model information includes a streaming computation graph and streaming model data, the streaming computation graph includes types of the second operators and connection relationships among the second operators, and the streaming model data includes computation parameters of the corresponding second operators.

S130: generating a target model information file according to the streaming model information.

In the present embodiments, the target model information file is a file that stores neural network model information under a target streaming architecture, and the target model information file is a file that can be moved or copied, and can be saved in a specified folder. The target model information file includes a target model structure description file and a target model data file. The target model structure description file contains all content in the streaming computation graph, and the target model data file contains all content in the streaming model data.

S140: running, under a target streaming architecture, the neural network model according to the target model information file.

In the present embodiments, the target model information file is a file that can be moved or copied. By moving or copying the target model information file to a chip based on a target streaming architecture, the neural network model developed based on the instruction set architecture can be deployed to be in the chip developed based on the streaming architecture for running, which improves the computation efficiency of the neural network model.

The neural network model conversion method according to the first embodiment of the present disclosure may be implemented on a same device, or may be implemented on different devices. As an example, operations S110 to S130 can be implemented on any device containing a central processing unit (CPU) or a graphics processing unit (GPU), such as a personal computer, a server and the like; and the operation S140 may be implemented on a device with streaming architecture, such as a chip, a board card and the like.

In the first embodiment of the present disclosure, a neural network model is parsed to obtain initial model information; and the initial model information is reconstructed to obtain streaming model information; a target model information file is generated according to the streaming model information; and the neural network model is run under a streaming architecture according to the target model information file, thereby achieving the object of deploying a neural network model developed under an instruction set architecture to be in a chip based on a streaming architecture for computation, which improves computation efficiency and development efficiency of the neural network model, and facilitates large-scale promotion and use of chips of streaming architectures.

Second Embodiment

Figure 2:
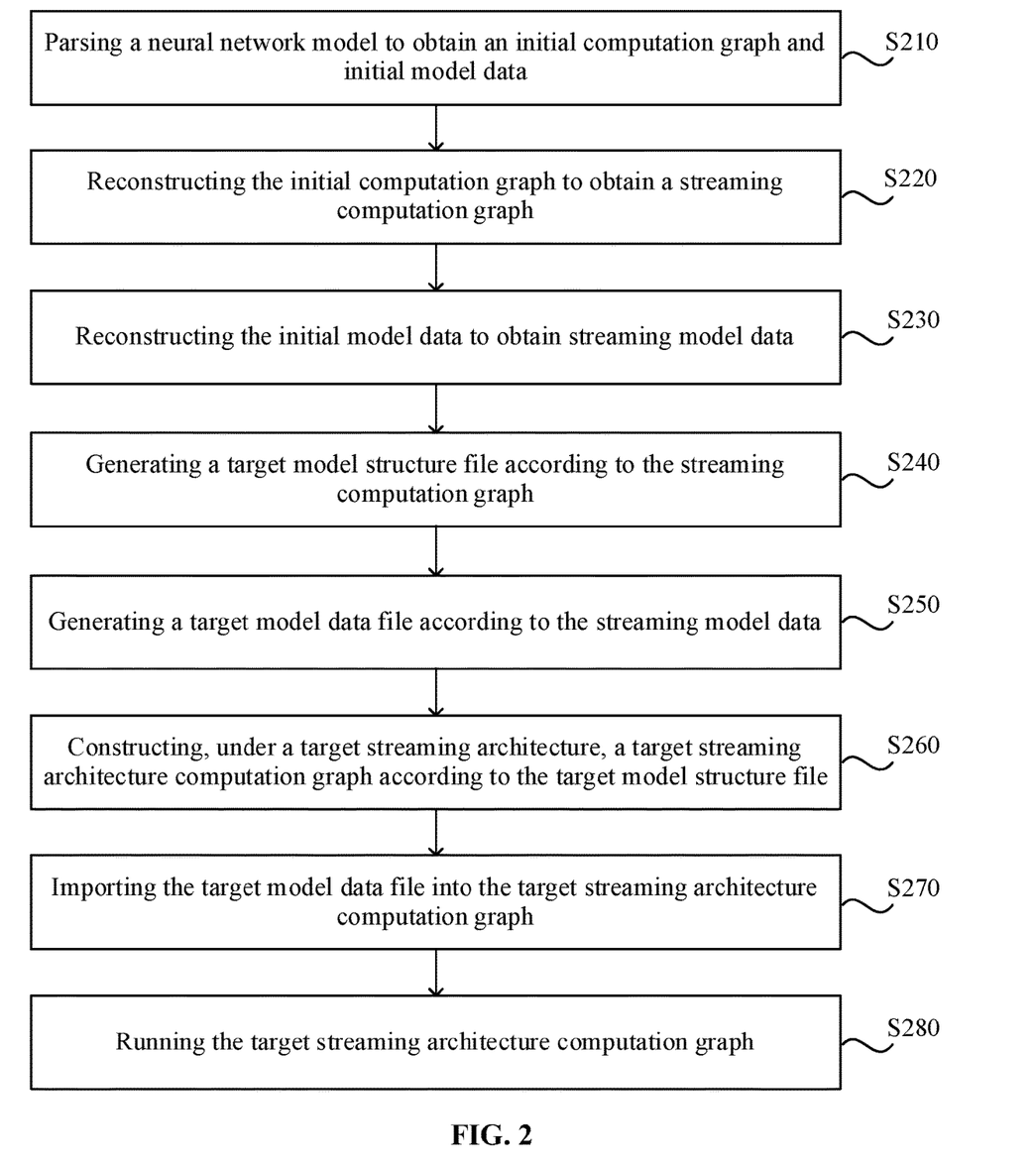
FIG. 2 is another schematic flowchart of a neural network model conversion method according to a second embodiment of the present disclosure.

FIG. 2 is another schematic flowchart of a neural network model conversion method according to a second embodiment of the present disclosure. The second embodiment of the present disclosure is described based on the foregoing embodiments. As shown in FIG. 2, the method may include operations: S210, S220, S230, S240, S250, S260, S270 and S280.

S210: parsing a neural network model to obtain an initial computation graph and initial model data.

In the present embodiments, parsing a neural network model is to decompose a neural network model, and extract a large number of first operators, connection relationships among the first operators, and computation parameters of the corresponding first operators included in the neural network model. The initial computation graph includes types of the first operators and the connection relationships among the first operators, and the initial model data includes the computation parameters of the corresponding first operators.

For example, the types of the first operators included in the initial computation graph are A1, A2, A3, and A4. The connection relationships among the first operators may be running A1+A2 first, and then running A1+A2+A3+A4. If a value on which A1 depends is 1, a value on which A2 depends is 2, a value on which A3 depends is 3, and a value on which A4 depends is 4, the initial model data includes 1, 2, 3, and 4.

S220: reconstructing the initial computation graph to obtain a streaming computation graph.

In the present embodiments, the streaming computation graph includes types of the second operators and connection relationships among the second operators, and the reconstructing the initial computation graph includes fusing and optimizing the first operators in the initial computation graph, to obtain the types of the second operators and the connection relationships among the second operators of the streaming computation graph. For example, the types of the first operators included in the initial computation graph are A1, A2, A3, and A4. The connection relationships among the first operators can be running A1+A2 first, then running A1+A2+A3+A4. A1+A2 is fused into B1, and A3+A4 is fused into B2, thus the types of the second operators of the streaming computation graph are B1 and B2, and the connection relationships of the second operators can be optimized as running B1 and B2 at the same time first, and then running B1+B2.

It can be known that the second operators of the streaming computation graph are formed by fusing the first operators of the initial computation graph. Granularities of the second operators are larger than those of the first operators, that is, granularities of the operators under the streaming architecture are larger than those of the operators under the instruction set architecture.

S230: reconstructing the initial model data to obtain streaming model data.

In the present embodiments, the streaming model data includes computation parameters of the corresponding second operators, and the reconstructing the initial model data includes integrating and optimizing the computation parameters of the corresponding first operators in the initial computation graph. For example, the types of the first operators included in the initial computation graph are A1, A2, A3, and A4, the initial model data includes 1, 2, 3, and 4, and the initial model data in the present embodiments may further include computation result data of the first operators. A1 and A2 are fused into B1, and A3 and A4 are fused into B2, thus the types of the second operators of the streaming computation graph are B1 and B2, and streaming model data corresponding to B1 includes 1 and 2, and streaming model data corresponding to B2 includes 3 and 4. The streaming model data in the present embodiments may further include computation result data of the second operators.

S240: generating a target model structure file according to the streaming computation graph.

In the present embodiments, the target model structure file includes the types of the second operators and the connection relationships among the second operators of the streaming computation graph. For example, the types of the second operators of the streaming computation graph are B1 and B2, and the connection relationships of the second operators can be optimized as running B1 and B2 at the same time first, and then run B1+B2. Thus, the target model structure file includes that the types of the second operators are B1 and B2, and the connection relationships of the second operators can be optimized as running B1 and B2 at the same time first, and then running B1+B2.

S250: generating a target model data file according to the streaming model data.

In the present embodiments, the target model data file includes computation parameters of the corresponding second operators in the streaming model data. For example, the streaming model data includes 1 and 2, 3 and 4, and thus the target model data file includes: 1 and 2, 3 and 4, and the streaming model data in the present embodiments may further include computation result data of the second operators.

S260: constructing, under a target streaming architecture, a target streaming architecture computation graph according to the target model structure file.

In the present embodiments, constructing a target streaming architecture computation graph according to the target model structure file is to construct, in a chip based on the target streaming architecture, a streaming computation graph in conversion of the neural network model, and the chip based on the target streaming architecture provides a suitable running environment for running of the neural network model under the streaming architecture. For example, the target model structure file includes that the types of the second operators are B1 and B2, and the connection relationships of the second operators can be optimized as running B1 and B2 at the same time first, and then running B1+B2, and the target streaming architecture computation graph constructed according to the target model structure file includes that types of third operators are B1 and B2, and connection relationships of the third operators can be optimized as running B1 and B2 at the same time first, and then running B1+B2.

S270: importing the target model data file into the target streaming architecture computation graph.

In the present embodiments, when the target streaming architecture computation graph is constructed, it is equivalent that a computation pipeline of the neural network model in the chip based on the target streaming architecture is constructed, and when the data in the target model data file is imported into the target streaming architecture computation graph, the target streaming architecture computation graph can perform computation. For example, the target model data file includes: 1 and 2, 3 and 4, and after the data in the target model data file is imported into the target streaming architecture computation graph, data parameters of the third operator B1 are 1 and 2, and data parameters of the third operator B2 are 3 and 4, and the streaming model data in the present embodiments may further include computation result data of the second operators.

S280: running the target streaming architecture computation graph.

In the present embodiments, running the target streaming architecture computation graph with data imported is to realize the conversion of the neural network model developed based on the instruction set architecture to be in the chip developed based on the streaming architecture for running.

The second embodiment of the present disclosure achieves the object of deploying the neural network model developed under an instruction set architecture to be in a chip based on a streaming architecture for operation, which improves the computation efficiency and development efficiency of the neural network model, and facilitates large-scale promotion and use of chips based on streaming architectures.

Third Embodiment

Figure 3:
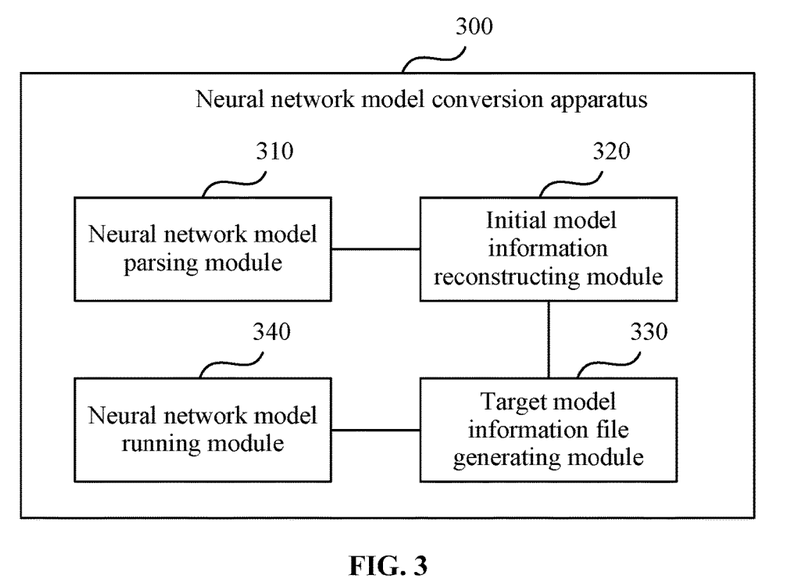
FIG. 3 is a schematic structural diagram of a neural network model conversion apparatus according to a third embodiment of the present disclosure.

FIG. 3 is a schematic structural diagram of a neural network model conversion apparatus according to a third embodiment of the present disclosure, and the present embodiments is applicable to deploying a neural network model developed under an instruction set architecture to a chip based on a streaming architecture for running. The apparatus can be embodied as software and/or hardware, and can be integrated on a server. The neural network model conversion apparatus according to the embodiment of the present disclosure can implement the neural network model conversion method according to any one of the embodiments of the present disclosure, and has corresponding functional modules for implementing the method, and beneficial effects corresponding to the method. For the contents not described in detail in the third embodiment of the present disclosure, reference may be made to the description in any method embodiment of the present disclosure.

As shown in FIG. 3, the neural network model conversion apparatus 300 according to the third embodiment of the present disclosure includes: a neural network model parsing module 310, an initial model information reconstructing module 320, a target model information file generating module 330 and a neural network model running module 340.

The neural network model parsing module 310 is configured to parse a neural network model to obtain initial model information.

The initial model information reconstructing module 320 is configured to reconstruct the initial model information to obtain streaming model information.

The target model information file generating module 330 is configured to generate a target model information file according to the streaming model information.

The neural network model running module 340 is configured to run, under a target streaming architecture, the neural network model according to the target model information file.

In one embodiment, the initial model information includes an initial computation graph and initial model data, and the neural network model parsing module 310 is configured to: parse the neural network model to obtain the initial computation graph and the initial model data.

In one embodiment, the streaming model information includes a streaming computation graph and streaming model data.

In one embodiment, the initial model information reconstructing module 320 is configured to: reconstruct the initial computation graph to obtain the streaming computation graph; and reconstruct the initial model data to obtain the streaming model data.

In one embodiment, the target model information file includes a target model structure file and a target model data file.

In one embodiment, the target model information file generating module 330 is configured to:
generate the target model structure file according to the streaming computation graph; and
generate the target model data file according to the streaming model data.

In one embodiment, the neural network model running module 340 is configured to:
construct, under the target streaming architecture, a target streaming architecture computation graph according to the target model structure file;
import the target model data file into the target streaming architecture computation graph; and
run the target streaming architecture computation graph.

The third embodiment of the present disclosure achieves the object of deploying the neural network model developed under an instruction set architecture to be in a chip based on a streaming architecture, for operation, through the neural network model parsing module, the initial model information reconstructing module, the target model information file generating module, and the neural network model running module, which improves the computation efficiency and development efficiency of the neural network model, and facilitates the large-scale promotion and use of chips based on streaming architectures.

Fourth Embodiment

Figure 4:
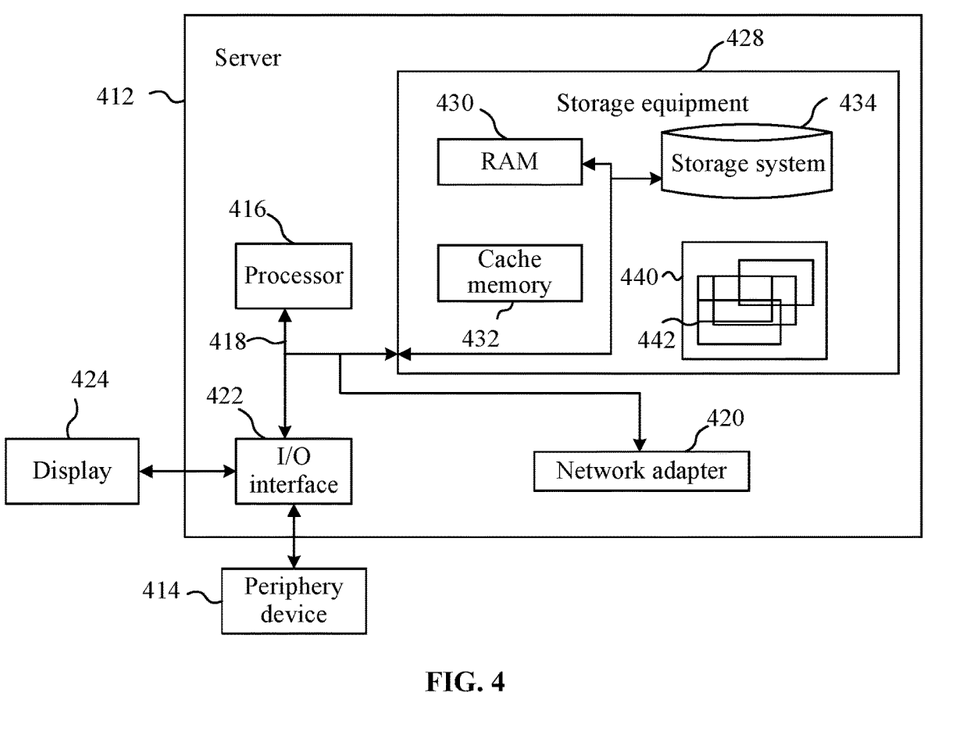
FIG. 4 is a schematic structural diagram of a server according to a fourth embodiment of the present disclosure.

FIG. 4 is a schematic structural diagram of a server according to a fourth embodiment of the present disclosure. FIG. 4 shows a block diagram of an exemplary server 412 suitable for implementing embodiments of the present disclosure. The server 412 shown in FIG. 4 is only an example, and should not impose any limitations on the functions and scope of use of the embodiments of the present disclosure.

As shown in FIG. 4, the server 412 is embodied as a general server. Components of the server 412 may include, but are not limited to, one or more processors 416, a storage equipment 428, and a bus 418 connecting various system components (including the storage equipment 428 and the processors 416).

The bus 418 represents one or more of several types of bus structures, including a storage equipment bus or a storage equipment controller, a peripheral bus, a graphics acceleration port, a processor, or a local bus using any of a variety of bus structures. For example, these architectures include, but are not limited to, an industry subversive alliance (ISA) bus, a micro channel architecture (MAC) bus, an enhanced ISA bus, a Video Electronics Standards Association (VESA) local bus and a peripheral component interconnect (PCI) bus.

In one embodiment, the server 412 includes a variety of computer system readable media. These media may be any available medium that can be accessed by the server 412, including volatile and non-volatile media, removable and non-removable media.

The storage equipment 428 may include computer system readable media in a form of volatile memory, such as random access memory (RAM) 430 and/or cache memory 432. In one embodiment, the server 412 may include other removable/non-removable, volatile/non-volatile computer system storage media. For example only, a storage system 434 may be configured to read and write to non-removable, non-volatile magnetic media (not shown in FIG. 4, commonly referred to as a "hard drive"). Although not shown in FIG. 4, a disk driver may be provided that is configured to read and write to removable non-volatile magnetic disks, such as "floppy disks", and to read and write to removable non-volatile optical disks, such as compact disc read-only memory (CD-ROM), digital video disc-read only memory (DVD-ROM) or other optical media. In these cases, each driver may be connected to the bus 418 through one or more data media interfaces. The storage equipment 428 may include at least one program product, and the program product has one (e.g., at least one) set of program modules configured to perform the functions of the embodiments of the present disclosure.

A program/utility 440 having one (at least one) set of program modules 442, may be stored, for example, in the storage equipment 428, such program modules 442 includes, but are not limited to, an operating system, one or more application programs, other program modules, and programs data, each or a combination of these examples may include an implementation of a network environment. The program modules 442 generally perform the functions and/or methods in the embodiments described in the present disclosure.

The server 412 may also communicate with one or more periphery devices 414 (e.g., keyboards, pointed servers, display 424, etc.), and may also communicate with one or more servers that enable a user to interact with the server 412, and/or with any server (e.g., a network card, modem, etc.) that enables the server 412 to communicate with one or more other computing servers. Such communication may be performed through an input/output (I/O) interface 422. Also, the server 412 may communicate with one or more networks (e.g., local area network (LAN), wide area network (WAN), and/or public networks such as the Internet) through a network adapter 420. As shown in FIG. 4, the network adapter 420 communicates with other modules of the server 412 via the bus 418. Although not shown, other hardware and/or software modules may be used in connection with the server 412, and include but are not limited to: micro-codes, server drivers, redundant processors, external disk drive arrays, redundant arrays of independent disks (RAID) systems, tape drives, data backup storage systems and the like.

The processor 416 runs the programs stored in the storage equipment 428, thereby executing a variety of functional applications and data processing, such as implementing the neural network model conversion method according to any embodiment of the present disclosure, and the method may include: parsing a neural network model to obtain initial model information; reconstructing the initial model information to obtain streaming model information; generating a target model information file according to the streaming model information; running, under a target streaming architecture, the neural network model according to the target model information file.

Fifth Embodiment

It is further provided according to a fifth embodiment of the present disclosure a non-transitory computer-readable storage medium, which stores a computer program, and the program, when being executed by a processor, implements the neural network model conversion method according to any embodiment of the present disclosure, and the method may include: parsing a neural network model to obtain initial model information; reconstructing the initial model information to obtain streaming model information; generating a target model information file according to the streaming model information; running, under a target streaming architecture, the neural network model according to the target model information file.

The computer storage medium according to the embodiments of the present disclosure may adopt any combination of one or more computer-readable media. The computer-readable medium may be a computer-readable signal medium or a computer-readable storage medium. The computer-readable storage medium can be, for example, but is not limited to, an electrical, magnetic, optical, electromagnetic, infrared, or semiconductor system, apparatus or device, or a combination of any of the foregoing. Examples (non-exhaustive list) of computer-readable storage media include: electrical connections having one or more wires, portable computer disks, hard disks, RAM, read-only memory (ROM), erasable programmable read-only memory (EPROM or flash memory), optical fiber, CD-ROM, optical storage device, magnetic storage device, or any suitable combination of the foregoing. In this document, a computer-readable storage medium can be any tangible medium that contains or stores a program, the program can be used by or in connection with an instruction execution system, apparatus, or device.

The computer-readable signal medium may include a data signal propagated in a baseband or as part of a carrier wave, with computer-readable program code embodied in the computer-readable signal medium. Such propagated data signals may take a variety of forms, including but not limited to electromagnetic signals, optical signals, or any suitable combination of the foregoing. The computer-readable signal medium can also be any computer-readable medium, other than the computer-readable storage medium, that can transmit, propagate, or transport the program for being used by or in connection with the instruction execution system, instruction execution apparatus, or device.

Program codes embodied on a computer readable medium may be transmitted by any suitable medium including but not limited to a wireless medium, a wired medium, an optical fiber cable, a radio frequency (RF), and etc., or, any suitable combination of the foregoing media.

Computer program codes for performing the operations of the present disclosure may be written with one or more programming languages or their combinations, the programming languages include object-oriented programming languages—such as Java, Smalltalk, C++, and further include conventional procedural programming language—such as the "C" language or similar programming language. The program codes may be executed entirely on the user's computer, partly on the user's computer, as a stand-alone software package, partly on the user's computer and partly on a remote computer, or entirely on a remote computer or terminal. Where a remote computer is involved, the remote computer may be connected to the user's computer through any kind of network, including a LAN or WAN, or may be connected to an external computer (e.g., connected through the internet provided by an internet service provider).

What is claimed is:

1. A neural network model conversion method, comprising:
    parsing a neural network model to obtain initial model information based on an instruction set architecture chip, the initial model information comprises an initial computation graph and initial model data, the initial computation graph comprises types of first operators and connection relationships among the first operators, and the initial model data comprises corresponding computation parameters of the first operators;

reconstructing the initial model information to obtain streaming model information based on a target streaming architecture chip, the streaming model information comprises a streaming computation graph and streaming model data, the streaming computation graph comprises types of second operators and connection relationships among the second operators, and the streaming model data comprises corresponding computation parameters of the second operators;

generating a target model information file according to the streaming model information, the target model information file is a file that stores neural network model information under the target streaming architecture chip;

generating a target model structure file according to the streaming computation graph, and generating a target model data file according to the streaming model data; and in the target streaming architecture chip, constructing a target streaming architecture computation graph according to the target model structure file, importing the target model data file into the target streaming architecture computation graph; and running the target streaming architecture computation graph.

2. The method according to claim 1, wherein the reconstructing the initial model information to obtain streaming model information comprises:

reconstructing an initial computation graph to obtain the streaming computation graph; and reconstructing initial model data to obtain the streaming model data.

3. A server, comprising:

at least one processor; and a storage equipment configured to store at least one program, wherein the at least one program, when being executed by the at least one processor, causes the at least one processor to implement:

parsing a neural network model to obtain initial model information based on an instruction set architecture chip, the initial model information comprises an initial computation graph and initial model data, the initial computation graph comprises types of first operators and connection relationships among the first operators, and the initial model data comprises corresponding computation parameters of the first operators;

reconstructing the initial model information to obtain streaming model information based on a target streaming architecture chip, the streaming model information comprises a streaming computation graph and streaming model data, the streaming computation graph comprises types of second operators and connection relationships among the second operators, and the streaming model data comprises corresponding computation parameters of the second operators;

generating a target model information file according to the streaming model information, the target model information file is a file that stores neural network model information under the target streaming architecture chip;

generating a target model structure file according to the streaming computation graph, and generating a target model data file according to the streaming model data; and in the target streaming architecture chip, constructing a target streaming architecture computation graph according to the target model structure file, importing the target model data file into the target streaming architecture computation graph; and running the target streaming architecture computation graph.

4. The server according to claim 3, wherein the at least one program, when being executed by the at least one processor, causes the at least one processor to implement:

reconstructing an initial computation graph to extract the streaming computation graph; and reconstructing initial model data to extract the streaming model data.

5. A non-transitory computer-readable storage medium, storing a computer program, wherein the computer program, when being executed by a processor, implements:

parsing a neural network model to obtain initial model information based on an instruction set architecture chip, the initial model information comprises an initial computation graph and initial model data, the initial computation graph comprises types of first operators and connection relationships among the first operators, and the initial model data comprises corresponding computation parameters of the first operators;

reconstructing the initial model information to obtain streaming model information based on a target streaming architecture chip, the streaming model information comprises a streaming computation graph and streaming model data, the streaming computation graph comprises types of second operators and connection relationships among the second operators, and the streaming model data comprises corresponding computation parameters of the second operators;

generating a target model information file according to the streaming model information, the target model information file is a file that stores neural network model information under the target streaming architecture chip;

generating a target model structure file according to the streaming computation graph, and generating a target model data file according to the streaming model data; and in the target streaming architecture chip, constructing a target streaming architecture computation graph according to the target model structure file, importing the target model data file into the target streaming architecture computation graph; and running the target streaming architecture computation graph.

* * * * *